United States Patent
Zha et al.

(10) Patent No.: US 7,591,950 B2
(45) Date of Patent: Sep. 22, 2009

(54) SUBMERGED CROSS-FLOW FILTRATION

(75) Inventors: Fufang Zha, West Ryde (AU); Gary C. Ganzi, Lexington, MA (US); Thomas W. Beck, North Richmond (AU)

(73) Assignee: Siemens Water Technologies Corp., Warrendale, PA (US)

( * ) Notice: Subject to any disclaimer, the term of this patent is extended or adjusted under 35 U.S.C. 154(b) by 0 days.

(21) Appl. No.: 11/441,819

(22) Filed: May 26, 2006

(65) Prior Publication Data

US 2006/0273007 A1 Dec. 7, 2006

Related U.S. Application Data

(63) Continuation-in-part of application No. PCT/AU2005/001662, filed on Oct. 26, 2005.

(60) Provisional application No. 60/684,710, filed on May 26, 2005.

(30) Foreign Application Priority Data

Nov. 2, 2004 (AU) .............................. 2004906322

(51) Int. Cl.
*B01D 61/00* (2006.01)
*B01D 63/00* (2006.01)
*C02F 1/44* (2006.01)

(52) U.S. Cl. ................... 210/650; 210/636; 210/321.8; 210/321.69; 210/321.9; 210/195.2

(58) Field of Classification Search ................. 210/636, 210/650, 321.8, 321.69, 760, 321.9, 195.1, 210/257.2, 232

See application file for complete search history.

(56) References Cited

U.S. PATENT DOCUMENTS

| 256,008 | A |   | 4/1882 | Leak |
| 285,321 | A |   | 9/1883 | Tams |
| 540,528 | A | * | 6/1895 | Williams .................... 416/116 |
| 1,997,074 | A |   | 4/1935 | Novotny |
| 2,080,783 | A |   | 5/1937 | Petersen |
| 2,105,700 | A |   | 1/1938 | Ramage |
| 2,843,038 | A |   | 7/1958 | Manspeaker |

(Continued)

FOREIGN PATENT DOCUMENTS

AU 34400/84 9/1983

(Continued)

OTHER PUBLICATIONS

Almulla et al., *Desalination*, 153 (2002), pp. 237-243.

(Continued)

*Primary Examiner*—Ana M Fortuna

(57) ABSTRACT

A membrane filtration module having a plurality of permeable, hollow membranes is disclosed. In use, a pressure differential is applied across the walls of the permeable, hollow membranes when immersed in a liquid suspension containing suspended solids. Some of the liquid suspension passes through the walls of the membranes to be drawn off as clarified liquid or permeate, and at least some of the solids are retained in or on the permeable, hollow membranes or otherwise as suspended solids within the liquid suspension. The module has a shell or similar structure that at least partially surrounds the membrane module and substantially effects retaining at least portion of fluid flowed into the membrane module.

19 Claims, 9 Drawing Sheets

U.S. PATENT DOCUMENTS

| | | |
|---|---|---|
| 2,926,086 A | 2/1960 | Chenicek et al. |
| 3,183,191 A | 5/1965 | Hach |
| 3,198,636 A | 8/1965 | Bouthilet |
| 3,228,876 A | 1/1966 | Mahon |
| 3,442,002 A | 5/1969 | Geary et al. |
| 3,462,362 A | 8/1969 | Kollsman |
| 3,492,698 A | 2/1970 | Geary et al. |
| 3,556,305 A | 1/1971 | Shorr |
| 3,591,010 A | 7/1971 | Pall |
| 3,625,827 A | 12/1971 | Wildi et al. |
| 3,654,147 A | 4/1972 | Levin et al. |
| 3,693,406 A | 9/1972 | Tobin |
| 3,700,561 A | 10/1972 | Ziffer |
| 3,708,071 A | 1/1973 | Crowley |
| 3,728,256 A * | 4/1973 | Cooper ................ 210/637 |
| 3,763,055 A | 10/1973 | White et al. |
| 3,791,631 A | 2/1974 | Meyer |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,731 A | 8/1978 | Yamazaki |
| 4,107,043 A | 8/1978 | McKinney |
| 4,138,460 A | 2/1979 | Tigner |
| 4,183,890 A | 1/1980 | Bollinger |
| 4,188,817 A | 2/1980 | Steigelmann et al. |
| 4,190,411 A | 2/1980 | Fujimoto |
| 4,192,750 A | 3/1980 | Elfes et al. |
| 4,193,780 A | 3/1980 | Cotton et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,302,336 A | 11/1981 | Kawaguchi et al. |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,369,605 A | 1/1983 | Opersteny et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,407,975 A | 10/1983 | Yamaguchi |
| 4,414,113 A | 11/1983 | LaTerra |
| 4,414,172 A | 11/1983 | Leason |
| 4,431,545 A | 2/1984 | Pall et al. |
| 4,451,369 A | 5/1984 | Sekino et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Müller |
| 4,519,909 A | 5/1985 | Castro |
| 4,540,490 A | 9/1985 | Shibata et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hoffman |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis |
| 4,650,596 A | 3/1987 | Schleuter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,904,426 A | 2/1990 | Lundgard et al. |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,963,304 A | 10/1990 | Im et al. |
| 4,968,430 A | 11/1990 | Hildenbrand et al. |
| 4,968,733 A | 11/1990 | Muller et al. |
| 4,969,997 A | 11/1990 | Klüver et al. |
| 4,988,444 A | 1/1991 | Applegate et al. |
| 4,999,038 A | 3/1991 | Lundberg |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,075,065 A | 12/1991 | Effenberger et al. |
| 5,076,925 A | 12/1991 | Roesink et al. |

| | | |
|---|---|---|
| 5,079,272 A | 1/1992 | Allegrezza et al. |
| 5,094,750 A | 3/1992 | Kopp et al. |
| 5,094,867 A | 3/1992 | Detering et al. |
| 5,098,567 A | 3/1992 | Nishiguchi |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,158,721 A | 10/1992 | Allegrezza et al. |
| 5,169,528 A | 12/1992 | Karbachsch et al. |
| 5,169,530 A * | 12/1992 | Schucker et al. ....... 210/321.81 |
| 5,182,019 A | 1/1993 | Cote et al. |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,262,054 A | 11/1993 | Wheeler |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachasch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,358,732 A | 10/1994 | Seifter et al. |
| 5,361,625 A | 11/1994 | Ylvisaker |
| 5,364,527 A | 11/1994 | Zimmerman et al. |
| 5,364,529 A | 11/1994 | Morin et al. |
| 5,374,353 A | 12/1994 | Murphy |
| 5,389,260 A | 2/1995 | Hemp |
| 5,393,433 A | 2/1995 | Espenan et al. |
| 5,396,019 A | 3/1995 | Sartori et al. |
| 5,401,401 A | 3/1995 | Hickok |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,451,317 A | 9/1995 | Ishida et al. |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghaven et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A * | 3/1997 | Cote et al. ................. 210/650 |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| D396,726 S | 8/1998 | Sadr et al. |
| D400,890 S | 11/1998 | Gambardella |
| 5,843,069 A | 12/1998 | Butler et al. |
| 5,846,424 A | 12/1998 | Khudenko |
| 5,888,401 A | 3/1999 | Nguyen |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,968,357 A | 10/1999 | Doelle et al. |
| 5,988,400 A | 11/1999 | Karachevtcev et al. |
| 5,997,745 A | 12/1999 | Tonelli et al. |
| 6,017,451 A | 1/2000 | Kopf |
| 6,024,872 A | 2/2000 | Mahendran |
| 6,036,030 A | 3/2000 | Stone et al. |
| 6,039,872 A | 3/2000 | Wu et al. |
| 6,042,677 A | 3/2000 | Mahendran et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,074,718 A | 6/2000 | Puglia et al. |
| 6,077,435 A | 6/2000 | Beck et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,146,747 A | 11/2000 | Wang et al. |
| 6,149,817 A * | 11/2000 | Peterson et al. ............. 210/644 |
| 6,156,200 A * | 12/2000 | Zha et al. ................ 210/321.89 |
| 6,159,373 A | 12/2000 | Beck et al. |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,214,232 B1 | 4/2001 | Baurmeister et al. |
| 6,221,247 B1 | 4/2001 | Nemser et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,290,756 B1 | 9/2001 | Macheras et al. |
| 6,294,039 B1 | 9/2001 | Mahendran et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,322,703 B1 | 11/2001 | Taniguchi et al. |
| 6,325,928 B1 | 12/2001 | Pedersen et al. |
| 6,337,018 B1 | 1/2002 | Mickols |
| RE37,549 E | 2/2002 | Mahendran et al. |
| 6,354,444 B1 | 3/2002 | Mahendran |
| 6,361,695 B1 | 3/2002 | Husain et al. |
| 6,368,819 B1 | 4/2002 | Gaddy et al. |

| | | | | | | |
|---|---|---|---|---|---|---|
| 6,375,848 | B1 | 4/2002 | Cote et al. | 7,041,728 B2 | 5/2006 | Zipplies et al. |
| 6,387,189 | B1 | 5/2002 | Gröschl et al. | 7,052,610 B2 | 5/2006 | Janson et al. |
| 6,402,955 | B2 | 6/2002 | Ookata | 7,083,733 B2 | 8/2006 | Freydina et al. |
| 6,406,629 | B1 | 6/2002 | Husain et al. | 7,147,778 B1 | 12/2006 | DiMassimo et al. |
| 6,423,214 | B1 | 7/2002 | Lindbo | 7,160,455 B2 * | 1/2007 | Taniguchi et al. ...... 210/321.88 |
| 6,423,784 | B1 | 7/2002 | Hamrock et al. | 7,160,463 B2 | 1/2007 | Beck et al. |
| 6,432,310 | B1 | 8/2002 | Andou et al. | 7,172,701 B2 | 2/2007 | Gaid et al. |
| 6,440,303 | B2 | 8/2002 | Spriegel | 7,223,340 B2 | 5/2007 | Zha et al. |
| D462,699 | S | 9/2002 | Johnson et al. | 7,226,541 B2 | 6/2007 | Muller et al. |
| 6,444,124 | B1 | 9/2002 | Onyeche et al. | 7,247,238 B2 | 7/2007 | Mullette et al. |
| 6,468,430 | B1 | 10/2002 | Kimura et al. | 7,264,716 B2 | 9/2007 | Johnson et al. |
| 6,485,645 | B1 | 11/2002 | Husain et al. | 7,300,002 B2 | 11/2007 | Muller |
| 6,495,041 | B2 | 12/2002 | Taniguchi et al. | 2001/0027951 A1 | 10/2001 | Gungerich et al. |
| 6,524,481 | B2 | 2/2003 | Zha et al. | 2002/0070157 A1 | 6/2002 | Yamada |
| 6,524,733 | B1 * | 2/2003 | Nonobe ....................... 429/23 | 2002/0148767 A1 | 10/2002 | Johnson et al. |
| 6,550,747 | B2 | 4/2003 | Rabie et al. | 2002/0153299 A1 | 10/2002 | Mahendran et al. |
| 6,555,005 | B1 * | 4/2003 | Zha et al. .................... 210/636 | 2002/0153313 A1 | 10/2002 | Cote |
| 6,562,237 | B1 | 5/2003 | Olaopa | 2003/0038080 A1 | 2/2003 | Vriens et al. |
| 6,576,136 | B1 | 6/2003 | De Moel et al. | 2003/0057155 A1 | 3/2003 | Husain et al. |
| D478,913 | S | 8/2003 | Johnson et al. | 2003/0075504 A1 | 4/2003 | Zha et al. |
| 6,613,222 | B2 | 9/2003 | Mikkelson et al. | 2003/0127388 A1 | 7/2003 | Ando et al. |
| 6,620,319 | B2 | 9/2003 | Behmann et al. | 2003/0136746 A1 | 7/2003 | Behman et al. |
| 6,627,082 | B2 | 9/2003 | Del Vecchio | 2003/0141248 A1 | 7/2003 | Mahendran et al. |
| 6,635,179 | B1 | 10/2003 | Summerton et al. | 2003/0146153 A1 | 8/2003 | Cote et al. |
| 6,641,733 | B2 * | 11/2003 | Zha et al. .................... 210/615 | 2003/0150807 A1 | 8/2003 | Bartels et al. |
| 6,645,374 | B2 | 11/2003 | Cote et al. | 2003/0159988 A1 | 8/2003 | Daigger et al. |
| 6,656,356 | B2 | 12/2003 | Gungerich et al. | 2003/0164332 A1 | 9/2003 | Mahendran et al. |
| 6,682,652 | B2 | 1/2004 | Mahendran et al. | 2003/0178365 A1 | 9/2003 | Zha et al. |
| 6,685,832 | B2 | 2/2004 | Mahendran et al. | 2003/0226797 A1 | 12/2003 | Phelps |
| 6,696,465 | B2 | 2/2004 | Dellaria et al. | 2003/0234221 A1 | 12/2003 | Johnson et al. |
| 6,702,561 | B2 | 3/2004 | Stillig et al. | 2004/0000520 A1 | 1/2004 | Gallagher et al. |
| 6,706,189 | B2 | 3/2004 | Rabie et al. | 2004/0007525 A1 | 1/2004 | Rabie et al. |
| 6,708,957 | B2 | 3/2004 | Cote et al. | 2004/0035770 A1 | 2/2004 | Edwards et al. |
| 6,712,970 | B1 | 3/2004 | Trivedi | 2004/0035782 A1 | 2/2004 | Muller |
| 6,721,529 | B2 | 4/2004 | Chen et al. | 2004/0084369 A1 | 5/2004 | Zha et al. |
| 6,723,758 | B2 | 4/2004 | Stone et al. | 2004/0145076 A1 | 7/2004 | Zha et al. |
| 6,727,305 | B1 | 4/2004 | Pavez Aranguiz | 2004/0168979 A1 | 9/2004 | Zha et al. |
| 6,743,362 | B1 | 6/2004 | Porteous et al. | 2004/0173525 A1 | 9/2004 | Hunniford et al. |
| 6,758,972 | B2 | 7/2004 | Vriens et al. | 2004/0178154 A1 | 9/2004 | Zha et al. |
| 6,770,202 | B1 | 8/2004 | Kidd et al. | 2004/0191894 A1 | 9/2004 | Muller et al. |
| 6,780,466 | B2 | 8/2004 | Grangeon et al. | 2004/0217053 A1 | 11/2004 | Zha et al. |
| 6,783,008 | B2 * | 8/2004 | Zha et al. .................... 210/485 | 2004/0232076 A1 | 11/2004 | Zha et al. |
| 6,790,912 | B2 | 9/2004 | Blong | 2005/0029185 A1 | 2/2005 | Muller |
| 6,805,806 | B2 | 10/2004 | Arnaud | 2005/0029186 A1 | 2/2005 | Muller |
| 6,808,629 | B2 | 10/2004 | Wouters-Wasiak et al. | 2005/0032982 A1 | 2/2005 | Muller et al. |
| 6,811,696 | B2 | 11/2004 | Wang et al. | 2005/0061725 A1 | 3/2005 | Liu et al. |
| 6,814,861 | B2 | 11/2004 | Husain et al. | 2005/0087898 A1 | 4/2005 | Cox et al. |
| 6,821,420 | B2 * | 11/2004 | Zha et al. ................ 210/321.69 | 2005/0103722 A1 | 5/2005 | Freydina et al. |
| 6,841,070 | B2 | 1/2005 | Zha et al. | 2005/0109692 A1 | 5/2005 | Zha et al. |
| 6,861,466 | B2 | 3/2005 | Dadalas et al. | 2005/0115880 A1 | 6/2005 | Pollock |
| 6,863,817 | B2 | 3/2005 | Liu et al. | 2005/0115899 A1 | 6/2005 | Liu et al. |
| 6,863,823 | B2 | 3/2005 | Côté | 2005/0139538 A1 | 6/2005 | Lazaredes |
| 6,869,534 | B2 | 3/2005 | McDowell et al. | 2005/0194310 A1 | 9/2005 | Yamamoto et al. |
| 6,872,305 | B2 | 3/2005 | Johnson et al. | 2005/0194315 A1 | 9/2005 | Adams et al. |
| 6,881,343 | B2 | 4/2005 | Rabie et al. | 2006/0000775 A1 | 1/2006 | Zha et al. |
| 6,884,350 | B2 | 4/2005 | Muller | 2006/0131234 A1 | 6/2006 | Zha et al. |
| 6,884,375 | B2 | 4/2005 | Wang et al. | 2006/0201876 A1 | 9/2006 | Jordan |
| 6,890,435 | B2 | 5/2005 | Ji et al. | 2006/0261007 A1 | 11/2006 | Zha et al. |
| 6,890,645 | B2 | 5/2005 | Disse et al. | 2006/0273038 A1 | 12/2006 | Syed et al. |
| 6,893,568 | B1 | 5/2005 | Janson et al. | 2007/0007214 A1 | 1/2007 | Zha et al. |
| 6,899,812 | B2 | 5/2005 | Cote et al. | 2007/0056905 A1 | 3/2007 | Beck et al. |
| 6,946,073 | B2 | 9/2005 | Daigger et al. | 2007/0075017 A1 | 4/2007 | Kuzma |
| 6,952,258 | B2 * | 10/2005 | Ebert et al. .................. 356/244 | 2007/0075021 A1 | 4/2007 | Johnson |
| 6,955,762 | B2 | 10/2005 | Gallagher et al. | 2007/0084791 A1 | 4/2007 | Jordan et al. |
| 6,964,741 | B2 | 11/2005 | Mahendran et al. | 2007/0084795 A1 | 4/2007 | Jordan |
| 6,969,465 | B2 * | 11/2005 | Zha et al. .................... 210/636 | 2007/0108125 A1 | 5/2007 | Cho et al. |
| 6,974,554 | B2 | 12/2005 | Cox et al. | 2007/0138090 A1 | 6/2007 | Jordan et al. |
| 6,994,867 | B1 | 2/2006 | Hossainy et al. | 2007/0170112 A1 | 7/2007 | Elefritz et al. |
| 7,005,100 | B2 | 2/2006 | Lowel | 2007/0227973 A1 | 10/2007 | Zha et al. |
| 7,014,763 | B2 | 3/2006 | Johnson et al. | | | |
| 7,018,530 | B2 | 3/2006 | Pollock | FOREIGN PATENT DOCUMENTS | | |
| 7,018,533 | B2 * | 3/2006 | Johnson et al. ......... 210/321.69 | | | |
| 7,022,233 | B2 | 4/2006 | Chen | AU | 55847/86 | 3/1985 |

| | | | | | | |
|---|---|---|---|---|---|---|
| AU | 77066/87 | 7/1986 | | JP | 62-179540 A2 | 8/1987 |
| CN | 1050770 C | 1/1995 | | JP | 62-250908 | 10/1987 |
| DE | 3904544 A1 | 8/1990 | | JP | 63-097634 A2 | 4/1988 |
| DE | 4117281 A1 | 1/1992 | | JP | 63-143905 A2 | 6/1988 |
| DE | 4113420 A1 | 10/1992 | | JP | 63-171607 | 7/1988 |
| DE | 4117422 A | 11/1992 | | JP | 63-180254 | 7/1988 |
| DE | 29804927 U1 | 6/1998 | | JP | 63-3884 * | 10/1988 |
| DE | 29906389 | 6/1999 | | JP | 01-151906 | 6/1989 |
| EP | 012557 B1 | 2/1983 | | JP | 01 307409 A2 | 12/1989 |
| EP | 126714 A2 | 11/1984 | | JP | 02-026625 | 1/1990 |
| EP | 050447 B1 | 10/1985 | | JP | 02-031200 | 2/1990 |
| EP | 250337 A1 | 12/1987 | | JP | 02-040296 A | 2/1990 |
| EP | 327025 A1 | 8/1989 | | JP | 02-107318 | 4/1990 |
| EP | 090383 B1 | 5/1990 | | JP | 02-126922 | 5/1990 |
| EP | 407900 A2 | 1/1991 | | JP | 02-144132 | 6/1990 |
| EP | 492942 A2 | 7/1992 | | JP | 02-164423 A2 | 6/1990 |
| EP | 518250 B1 | 12/1992 | | JP | 02-277528 | 11/1990 |
| EP | 547575 A1 | 6/1993 | | JP | 02-284035 A2 | 11/1990 |
| EP | 395133 B1 | 2/1995 | | JP | 03-018373 A2 | 1/1991 |
| EP | 463627 B1 | 5/1995 | | JP | 03-028797 A2 | 2/1991 |
| EP | 662341 A1 | 7/1995 | | JP | 03-110445 | 5/1991 |
| EP | 492446 B1 | 11/1995 | | JP | 04-187224 | 7/1992 |
| EP | 430082 B1 | 6/1996 | | JP | 04-250898 | 9/1992 |
| EP | 734758 A1 | 10/1996 | | JP | 04-256424 | 9/1992 |
| EP | 763758 A1 | 10/1996 | | JP | 04-265128 | 9/1992 |
| EP | 824956 A2 | 2/1998 | | JP | 4256424 * | 9/1992 |
| EP | 855214 A1 | 7/1998 | | JP | 04-293527 | 10/1992 |
| EP | 627255 B1 | 1/1999 | | JP | 04-310223 A2 | 11/1992 |
| EP | 911073 A1 | 4/1999 | | JP | 04-334530 | 11/1992 |
| EP | 920904 A2 | 6/1999 | | JP | 04-348252 | 12/1992 |
| EP | 1 034 835 | 9/2000 | | JP | 05-023557 A2 | 2/1993 |
| EP | 1034835 A1 * | 9/2000 | | JP | 05-096136 | 4/1993 |
| EP | 1052012 A1 | 11/2000 | | JP | 05-137977 | 6/1993 |
| EP | 1349644 | 10/2003 | | JP | 05-157654 A2 | 6/1993 |
| EP | 1350555 A1 | 10/2003 | | JP | 05-285348 | 11/1993 |
| EP | 1236503 B1 | 8/2004 | | JP | 06-071120 A2 | 3/1994 |
| EP | 1659171 A | 5/2006 | | JP | 06-114240 A2 | 4/1994 |
| FR | 2620712 | 3/1989 | | JP | 06-218237 | 8/1994 |
| FR | 2674448 A1 | 2/1992 | | JP | 06-277469 | 10/1994 |
| FR | 2699424 | 6/1994 | | JP | 06-285496 | 10/1994 |
| FR | 2762834 A | 11/1998 | | JP | 06-343837 A2 | 12/1994 |
| GB | 702911 | 1/1954 | | JP | 07-000770 A2 | 1/1995 |
| GB | 2253572 A | 9/1992 | | JP | 07-024272 | 1/1995 |
| JP | 54-162684 | 12/1979 | | JP | 07-068139 | 3/1995 |
| JP | 55-129155 | 6/1980 | | JP | 07-136470 | 5/1995 |
| JP | 55-099703 | 7/1980 | | JP | 07-136471 | 5/1995 |
| JP | 55-129107 | 10/1980 | | JP | 07-155758 | 6/1995 |
| JP | 56-021604 | 2/1981 | | JP | 07-178323 | 7/1995 |
| JP | 56-118701 | 9/1981 | | JP | 07-185268 A2 | 7/1995 |
| JP | 56-121685 | 9/1981 | | JP | 07-185271 | 7/1995 |
| JP | 58-088007 A2 | 5/1983 | | JP | HP 7-185268 * | 7/1995 |
| JP | 60-019002 | 1/1985 | | JP | 07-236819 | 9/1995 |
| JP | 60-206412 | 10/1985 | | JP | 07-251043 | 10/1995 |
| JP | 61-097005 | 5/1986 | | JP | 07-275665 A2 | 10/1995 |
| JP | 61-097006 A2 | 5/1986 | | JP | 07-289860 | 11/1995 |
| JP | 61-107905 A2 | 5/1986 | | JP | 07-303895 | 11/1995 |
| JP | 61-167406 | 7/1986 | | JP | 08-010585 A2 | 1/1996 |
| JP | 61-167407 | 7/1986 | | JP | 09-072993 | 3/1997 |
| JP | S6338884 | 7/1986 | | JP | 09-099227 | 4/1997 |
| JP | 61-171504 | 8/1986 | | JP | 09-141063 A2 | 6/1997 |
| JP | 61-192309 | 8/1986 | | JP | 09-187628 | 7/1997 |
| JP | 61-222510 | 10/1986 | | JP | 09-220569 | 8/1997 |
| JP | 61-242607 | 10/1986 | | JP | 09-271641 | 10/1997 |
| JP | 61-249505 | 11/1986 | | JP | 09-324067 | 12/1997 |
| JP | 61-257203 A2 | 11/1986 | | JP | 10-033955 | 2/1998 |
| JP | 61-263605 A2 | 11/1986 | | JP | 10-048466 | 2/1998 |
| JP | 61-291007 | 12/1986 | | JP | 10-085565 | 4/1998 |
| JP | 61-293504 | 12/1986 | | JP | 10-156149 A2 | 6/1998 |
| JP | 62-004408 A2 | 1/1987 | | JP | 63-143905 | 6/1998 |
| JP | 62-114609 A2 | 5/1987 | | JP | 11-028467 | 2/1999 |
| JP | 62-140607 A2 | 6/1987 | | JP | 11-156166 | 6/1999 |
| JP | 62-144708 | 6/1987 | | JP | 11-165200 | 6/1999 |
| JP | 62-163708 | 7/1987 | | JP | 11-333265 | 7/1999 |

| | | |
|---|---|---|
| JP | 11-033365 | 9/1999 |
| JP | 11-319507 | 11/1999 |
| JP | 2000-070684 | 3/2000 |
| JP | 2000-185220 | 4/2000 |
| JP | 2000-157850 | 6/2000 |
| JP | 2000-317276 | 11/2000 |
| JP | 00-0342932 | 12/2000 |
| JP | 2001-009246 | 1/2001 |
| JP | 2001-070967 | 3/2001 |
| JP | 2001-079367 | 3/2001 |
| JP | 2001-104760 | 4/2001 |
| JP | 2001-190937 | 7/2001 |
| JP | 2001-190938 | 7/2001 |
| JP | 2001-205055 | 7/2001 |
| JP | 2003-047830 | 2/2003 |
| JP | 2003-062436 | 3/2003 |
| JP | 2003-135935 | 5/2003 |
| JP | 05-279447 A | 10/2005 |
| KR | 2002-0090967 | 12/2002 |
| NL | 1020491 C | 10/2003 |
| NL | 1021197 C | 10/2003 |
| TW | 347343 | 12/1998 |
| WO | WO 88-06200 | 8/1988 |
| WO | WO 89-00880 | 2/1989 |
| WO | WO 90/00434 | 1/1990 |
| WO | WO 91-04783 | 4/1991 |
| WO | WO 91/16124 A1 | 10/1991 |
| WO | WO 93/02779 A1 | 2/1993 |
| WO | WO 93/15827 | 8/1993 |
| WO | WO 93-23152 | 11/1993 |
| WO | WO 94-11094 | 5/1994 |
| WO | WO 95-34424 | 12/1995 |
| WO | WO 96-07470 A1 | 3/1996 |
| WO | WO 96-28236 | 9/1996 |
| WO | WO 96/41676 | 12/1996 |
| WO | WO 97/06880 A2 | 2/1997 |
| WO | WO 98/22204 A1 | 5/1998 |
| WO | WO 98-25694 | 6/1998 |
| WO | WO 98/28066 * | 7/1998 |
| WO | WO 98-53902 | 12/1998 |
| WO | WO 99-01207 | 1/1999 |
| WO | WO 99/59707 | 11/1999 |
| WO | WO 00-18498 | 4/2000 |
| WO | WO 00-30742 | 6/2000 |
| WO | WO 01-00307 | 1/2001 |
| WO | WO 01-32299 | 5/2001 |
| WO | WO 01/36075 A1 | 5/2001 |
| WO | WO 01-45829 A1 | 6/2001 |
| WO | WO 02-40140 A1 | 5/2002 |
| WO | WO 03/000389 A2 | 1/2003 |
| WO | WO 03-013706 A1 | 2/2003 |
| WO | WO 2004/101120 * | 11/2004 |
| WO | WO 2005-021140 A1 | 3/2005 |
| WO | WO 2005-037414 A1 | 4/2005 |
| WO | WO 2005-077499 A1 | 8/2005 |
| WO | WO 2005-107929 A | 11/2005 |
| WO | WO 2006-029456 A1 | 3/2006 |

OTHER PUBLICATIONS

Cote et al., *Wat. Sci. Tech.* 38(4-5) (1998), pp. 437-442.
Johnson, "Recent Advances in Microfiltration for Drinking Water Treatment," AWWA Annual Conference, Jun. 20-24, 1999, Chicago, Illinois, entire publication.
Kaiya et al., "Water Purification Using Hollow Fiber Microfiltration Membranes," 6th World Filtration Congress, Nagoya, 1993, pp. 813-816.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Rosenberger et al., *Desalination*, 151 (2002), pp. 195-200.
Ueda et al., "Effects of Aeration on Suction Pressure in a Submerged Membrane Bioreactor," *Wat. Res.* vol. 31, No. 3, 1997, pp. 489-494.
Zenon, "Proposal for ZeeWeed® Membrane Filtration Equipment System for the City of Westminster, Colorado, Proposal No. 479-99," Mar. 2000, entire publication.
Anonymous, *"Nonwoven Constructions of Dyneon™ THV and Dyneon™ The Fluorothermoplastics"*, Research Disclosure Journal, Apr. 1999, RD 420013, 2 pages.
Cote, et al. "A New Immersed Membrane for Pretreatment to Reverse Osmosis" Desalination 139 (2001) 229-236.
Crawford et al., "Procurement of Membrane Equipment: Differences Between Water Treatment and Membrane Bioreactor (MBR) Applications" (2003).
Davis et al., Membrane Technology Conference, "Membrane Bioreactor Evaluation for Water Reuse in Seattle, Washington" (2003).
DeCarolis et al., Membrane Technology Conference, "Optimization of Various MBR Systems for Water Reclamation" (2003).
Dow Chemicals Company, "Filmtec Membranes—Cleaning Procedures for Filmtec FT30 Elements," Tech Facts, Online, Jun. 30, 2000, XP002237568.
Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.
Recent Advances in Microfiltration for Drinking Water Treatment; An Introduction to CMF-S, Presentation.
Kang et al. "Characteristics of microfiltration membranes in a membrane coupled sequencing batch reactor system" Water Research, Elsevier, Amsterdam, NL, vol. 37, No. 5, Mar. 2003.
Lloyd D.R. et al. "Microporous Membrane Formation Via Thermally Induced Phase Separation-Solid-Liquid Phase Separation" *Journal of Membrane Science*, (Sep. 15, 1990), pp. 239-261, vol. 52, No. 3, Elsevier Scientific Publishing Company, Amsterdam, NL.
MicroC™—Carbon Source for Wastewater Denitrification. Information from Environmental Operating Solutions website including MSDS.
Nakayama, "Introduction to Fluid Mechanics," Butterworth-Heinemann, Oxford, UK, 2000.
Ramaswammy S. et al. "Fabrication of Ply (ECTFE) Membranes via thermally induced phase Separation", *Journal of Membrane Science*, (Dec. 1, 2002), pp. 175-180, vol. 210 No. 1, Scientific Publishing Company, Amsterdam, NL.
*Water Encyclopedia*, edited by Jay Lehr, published by John Wiley & Sons, Inc., Hoboken, New Jersey, 2005. Available at http://wwwmrw.interscience.wiley.com/eow/.
White et al., *The Chemical Engineering Journal*, 52 (1993), pp. 73-77.
Wikipedia, "Seawater," available at http://en.wikipedia.org/wiki/Seawater, Jul. 15, 2007.
Yoon: "Important operational parameters of membrane bioreactor-sludge disintegration (MBR-SD) system for zero excess sludge production" Water Research, Elsevier, Amsterdam, NL, vol. 37, No. 8, Apr. 2003.

* cited by examiner

SUBMERGED CROSS-FLOW FILTRATION

CROSS-REFERENCE TO RELATED APPLICATIONS

This application claims priority under to U.S. Provisional Application Ser. No. 60/684,710, entitled "HYBRID TANGENTIAL FLOW MEMBRANE MODULE FOR IMMERSED WATER AND WASTEWATER APPLICATION," filed on May 26, 2005, and is a continuation-in-part of International Application No. PCT/AU2005/001662, filed Oct. 26, 2005 under the Patent Cooperation Treaty, which was published by the International Bureau in English on May 11, 2006 as International Publication Number WO 2006/047814 A1, which designates the U.S. and claims the benefit of Australian Application No. 2004906322, filed on Nov. 2, 2004, each of which is incorporated herein in its entirety.

BACKGROUND OF THE INVENTION

1. Field of Invention

The present invention relates to membrane filtration systems and, more particularly, to submerged membrane filtration systems and their operation.

2. Discussion of Related Art

Submerged membrane filtration process with air scrubbing emerged in the 1980's. The driving force for filtration by suction or static head instead of pressurization was the elimination of the need for a pressure vessel to contain membrane modules, resulting in significant savings on the capital expense of a membrane filtration system. The gas/air consumption, required to scrub the membranes, however, was found to be a dominant portion in operating energy used in such a filtration process which resulted in high than expected operating costs. Consequently, efforts have been undertaken to reduce the gas/air consumption since the introduction of such systems.

There have been two main directions followed: a) improving the membranes' property with low fouling rate and high permeability; and b) improving the filtration/cleaning process.

Several factors can influence the scrubbing efficacy of a membrane to improve the cleaning process. Air could be more efficiently used by re-arranging modules to have a smaller footprint. In this way the amount of air could be concentrated to more efficiently scour the membranes. The use of high packing density modules also saves air consumption per membrane area. Intermittently scouring membranes with air instead of continuous injection is another way to save air consumption.

Another technique uses a mixture of gas and liquid to scrub the membrane. This method is may be advantageous in membrane bioreactor applications where the membrane filters mixed liquor containing a high concentration of suspended solids and a recirculation of mixed liquor is required to achieve denitrification. This method exploits a mixed liquor recirculation flow to scrub the membranes with air, to minimize the solid concentration polarization near the membrane surface and to prevent the dehydration of mixed liquor. The design of the membrane module aims to achieve a uniform distribution of the two-phase mixture into the membrane bundles. Membranes in known modules are typically either freely exposed to the feed or restricted in a perforated cage. Therefore there is still a certain loss of energy during the fluid transfer along the modules.

In the early stage of membrane process development, cross-flow filtration was commonly used, where a shear force was created by pumping a high velocity of feed across the membrane surface. Because more energy is required to create a high shear force to effectively clean the membrane, the application of the cross-flow filtration process is now limited, mainly to tubular membrane filtration applications.

SUMMARY OF THE INVENTION

The invention is directed to filtration systems and techniques of operation thereof.

In accordance with some aspects of the invention, the filtration system can be a membrane filtration system comprising a vessel having an inlet fluidly connectable to a source of a liquid having solids suspended therein, a membrane module disposed in the vessel, the membrane module comprising a shell at least partially enclosing a plurality of hollow fiber membranes and at least one scouring port disposed to introduce a scouring fluid comprising a gas, a liquid, or a mixture thereof to the fiber membranes.

In accordance with further aspects of the invention, the filtration system can be directed to a membrane module comprising a plurality of fiber membranes, means for introducing a scouring fluid to the plurality of fiber membranes, and means for retaining the scouring fluid adjacent the plurality of fiber membranes.

Still further aspects of the invention relate to treating or purifying water or a liquid having solids suspended therein. In such aspects, some embodiments of the invention can involve a method of purifying water having solids suspended therein. The method can comprise one or more acts or steps of introducing the water to a membrane module comprising a shell surrounding a plurality of hollow fiber membranes, the shell having a retentate exit port disposed adjacent to at least one of a lower potting head and an upper potting head, introducing a scouring fluid into a volume enclosed by the shell, the scouring fluid comprising a gas, a liquid, or a mixture thereof, and withdrawing permeate through the hollow fiber membranes to produce purified water.

According to some aspects, the present invention provides a membrane filtration module having a plurality of permeable, hollow membranes mounted therein, wherein, in use, a pressure differential is applied across the walls of the permeable, hollow membranes immersed in a liquid suspension containing suspended solids, said liquid suspension being applied to one surface of the permeable, hollow membranes to induce and sustain filtration through the membrane walls. Some of the liquid suspension passes through the walls of the membranes to be drawn off as clarified liquid or permeate, and at least some of the solids are retained on or in the permeable, hollow membranes or otherwise as suspended solids within the liquid suspension, the module including a fluid retaining means at least partially surrounding the membrane module for substantially retaining at least part of fluid flowed into the membrane module.

According to other aspects, the present invention provides a method of filtering solids from a liquid suspension using a plurality of permeable, hollow membranes mounted in a membrane module. The method can comprise acts or steps of flowing a fluid containing said liquid suspension into said membrane module such that said liquid suspension is applied to one surface of the permeable, hollow membranes; applying a pressure differential across the walls of the permeable, hollow membranes immersed in the liquid suspension containing suspended solids to induce and sustain filtration through the membrane walls wherein some of the liquid suspension passes through the walls of the membranes to be drawn off as clarified liquid or permeate, and at least some of the solids are retained on or in the permeable, hollow membranes or otherwise as suspended solids within the liquid suspension, and substantially retaining at least part of the fluid flowed into the membrane module by at least partially surrounding the membrane module with a fluid retaining means.

BRIEF DESCRIPTION OF THE DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figures 1A, 1B, 1C:
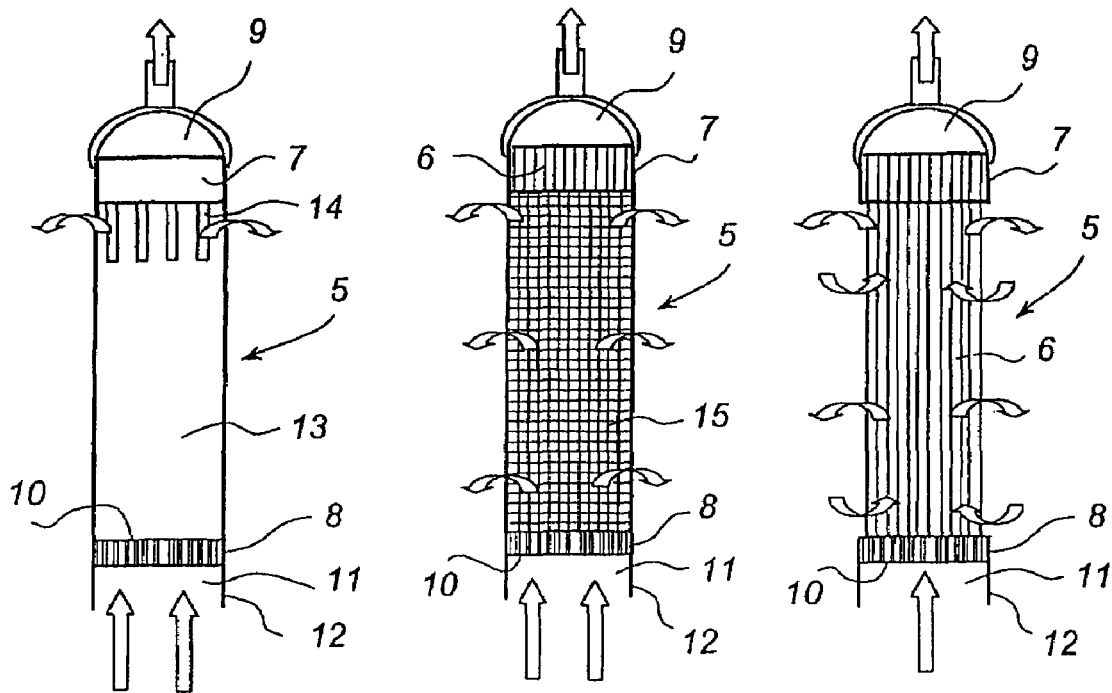
FIG. 1a is a schematic illustration showing a simplified sectional side elevation view of membrane module configuration according to an embodiment of the invention.
FIG. 1b is a schematic illustration showing a sectional side elevation view of a membrane module configuration having a screen.
FIG. 1c is a schematic illustration showing a sectional side elevation view of a known membrane module configuration without restraint around the fiber membranes.
Figure 2A:
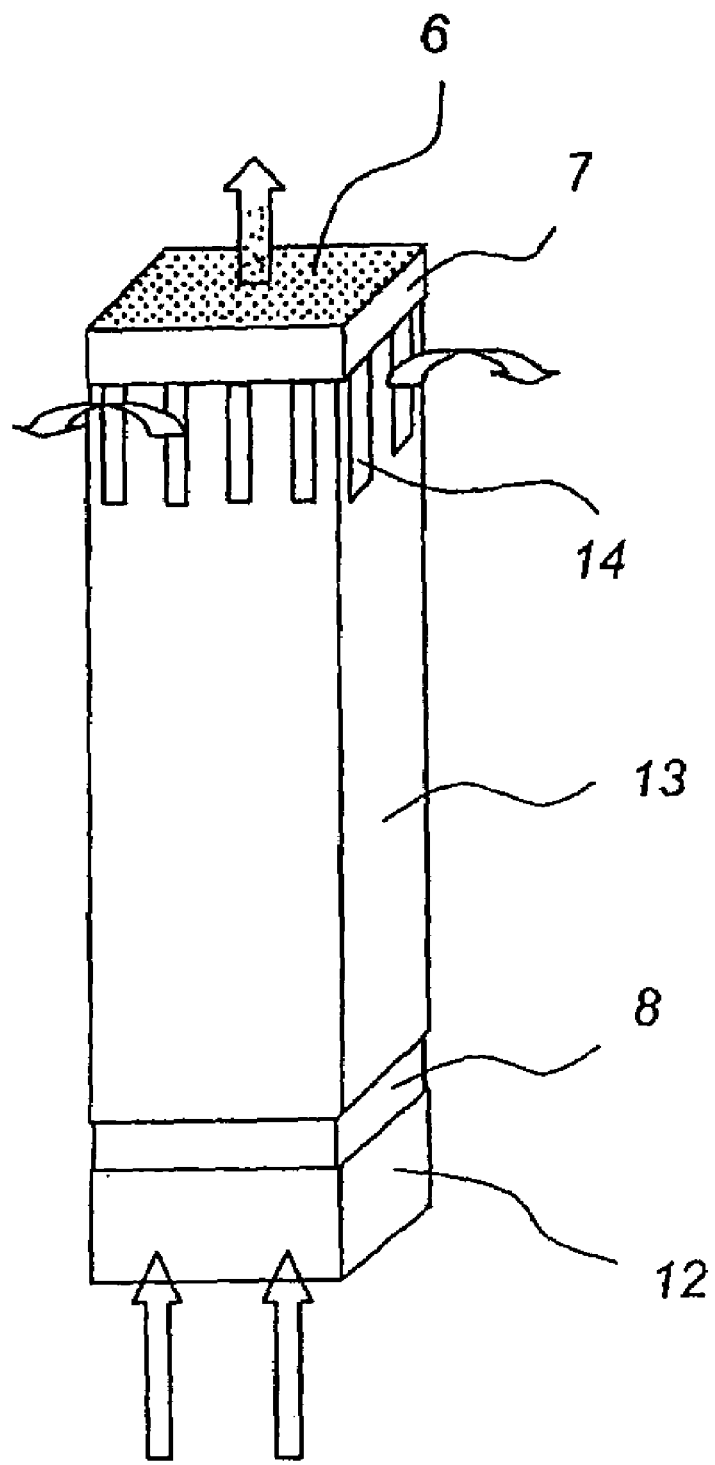
FIGS. 2a, 2b, 2c, 2d, and 2e are schematic illustrations showing perspective views of membrane module configurations according to one or more embodiments of the invention.
Figure 2B:
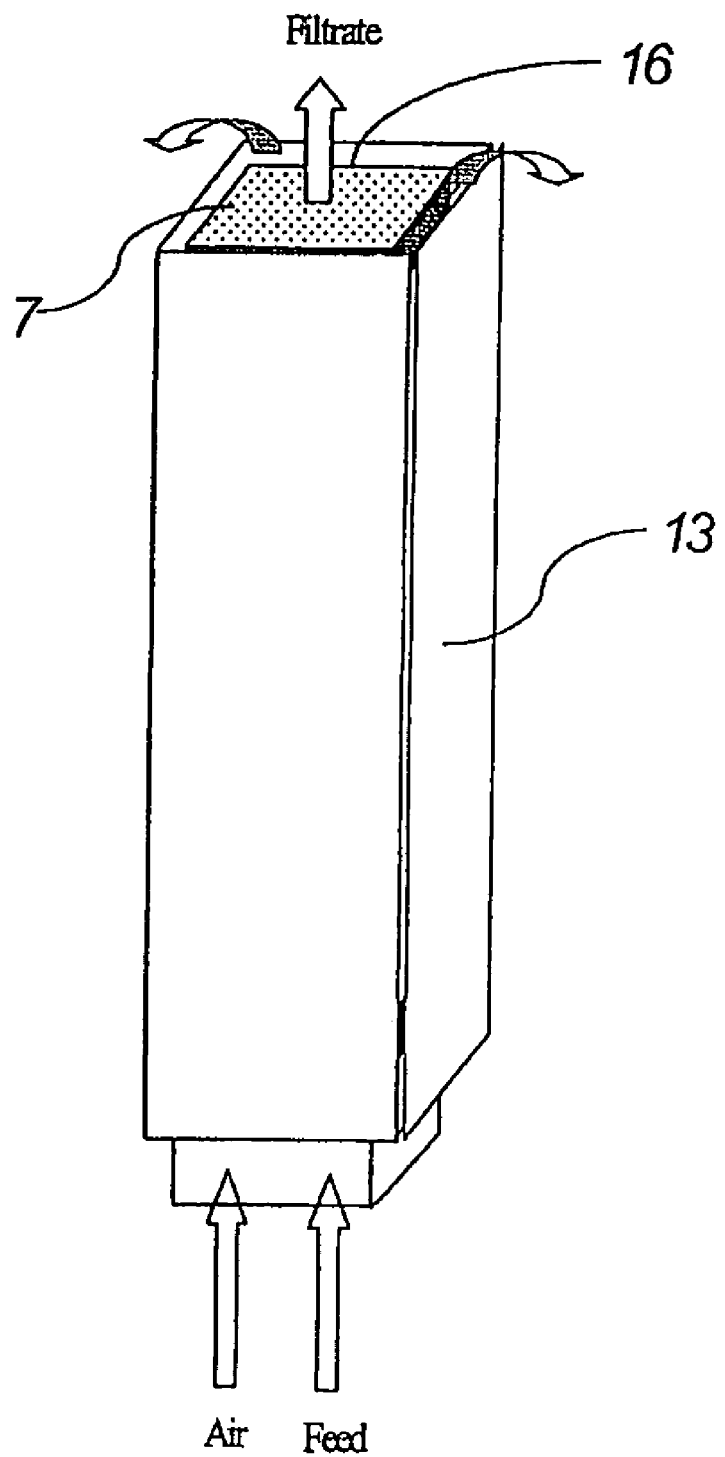
Figure 2C:
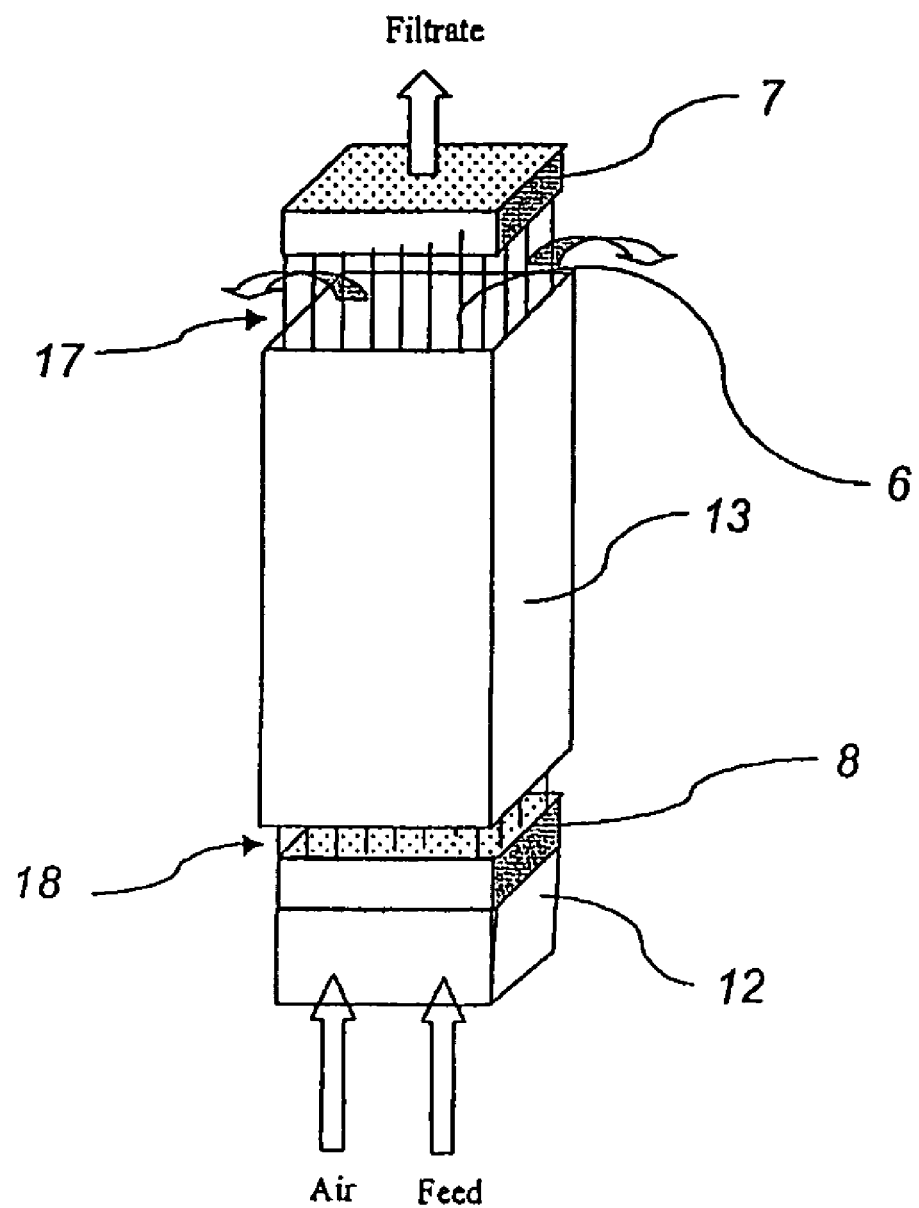
Figure 2D:
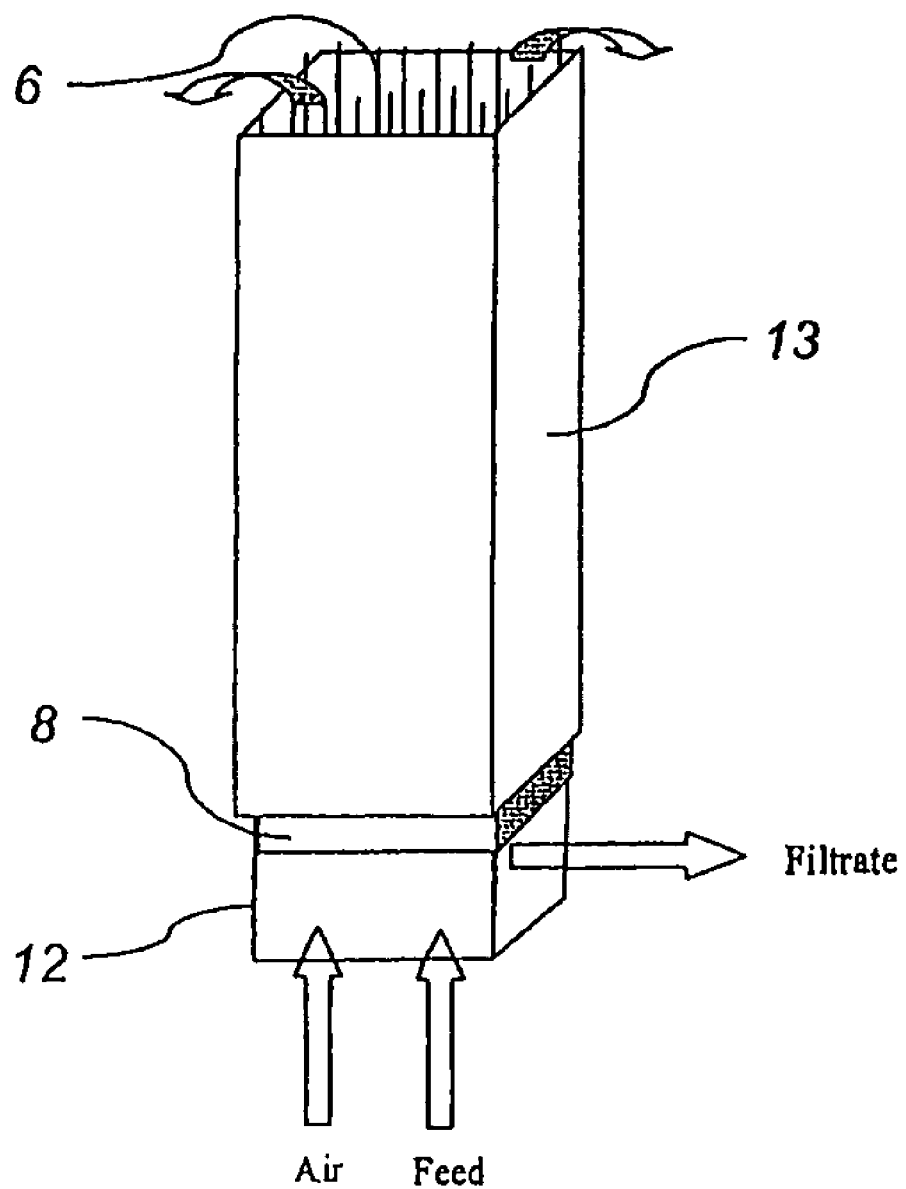
Figure 2E:
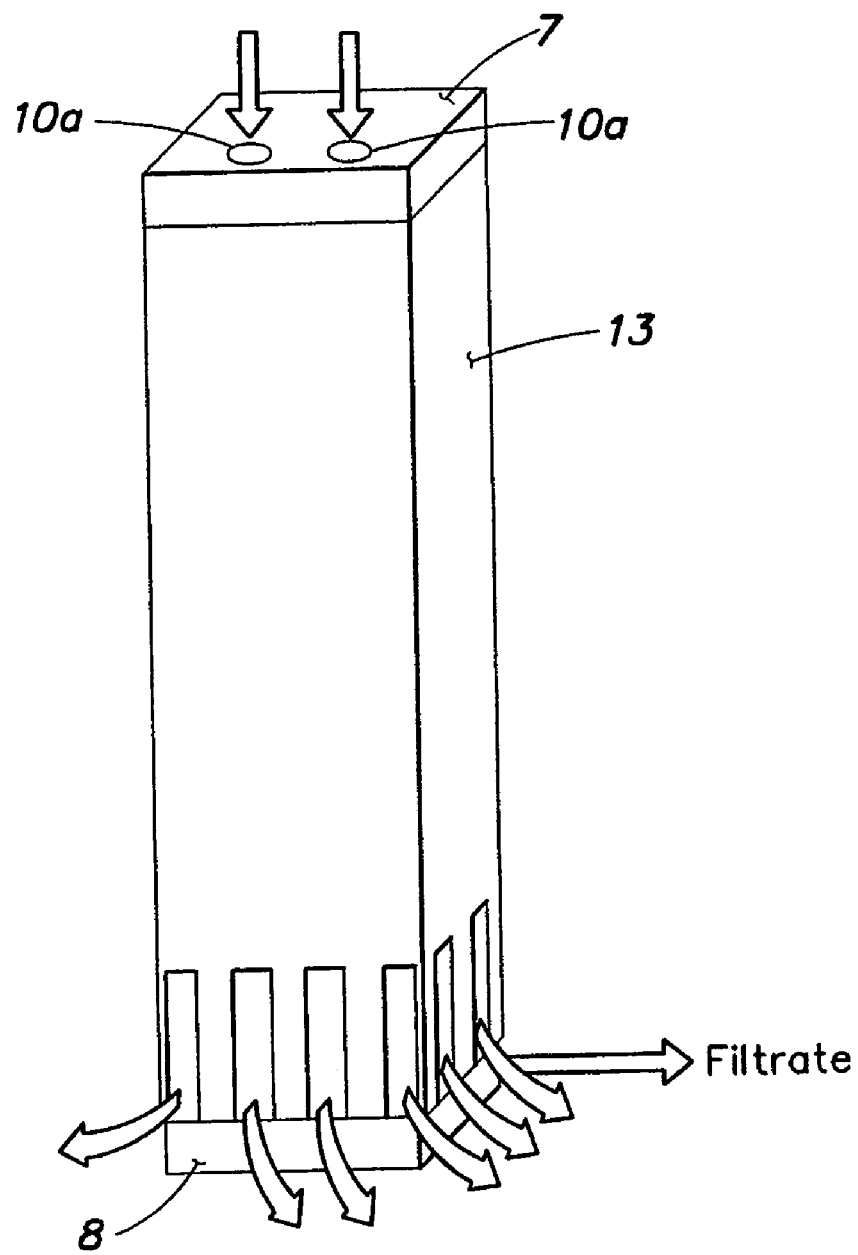

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Some aspects of the invention are directed to immersed membrane separation systems and techniques. Particular embodiments of the invention are directed to preventing, inhibiting, or at least reducing any phenomena or limitations associated with concentration polarization, fouling, and particulate plugging of membrane filtration systems. The systems of the invention can reduce the need, or frequency, for cleaning techniques, such as those involving backwashing, chemical cleaning or washing, and/or air scouring.

The configurations and techniques of the invention can advantageously modify typical air scouring subsystems and assemblies used to effect cleaning of filtration components. Some aspects of the invention directed to one or more such subsystems can advantageously improve the overall effectiveness of membrane filtration systems by reducing any one or more of the size of membrane filtration systems, the effective throughput or processing capacity of filtration systems, and/or the reliability of filtration systems. The configurations and techniques of the invention further can also improve overall membrane filtration system operational efficiencies by, inter alia, reducing the operating loads thereof by, for example, reducing the energy requirements associated with the scouring or cleaning subsystems thereof.

Some aspects of the invention relate to scouring the fiber membranes. Scouring can be affected with one or more scouring fluids that facilitate removal of any solids in or on the membranes. The scouring fluid can comprise a gas with at least some of the liquid suspension. Preferred arrangements can be directed to those wherein the fluid also includes gas and/or a gas/liquid mixture.

Furthermore, scouring can be performed cyclically, intermittently, or continuously, to also facilitate mixing the immersion liquid within the tank by generating flow currents and eddies that aid in improving membrane flux. However, some scouring systems and techniques require slack or flexibility in the membranes but such movement can result in membrane breakage which results in a loss of system integrity. Once a membrane breaks, a costly replacement or repair process is required. The invention discloses arrangements, configurations, and techniques that can reduce such undesirable incidents. Further, effective scouring in immersed systems typically requires complex and costly baffle arrangement and air flow directional and positioning control features because scouring must occur throughout the membrane module, and because undirected air bubbles will tend to seek open volumes, rather than push themselves against the membranes to effect cleaning activity. The systems and techniques of the invention can further improve one or more features thereof by enhancing the effect of scouring when, for example, utilized or adapted to systems containing high solids content that typically have vertically oriented modules because bubbles in such systems tend to run up along the membranes during scouring. However, the invention is not limited to such configurations and may be practiced in systems that involve, for example, horizontally disposed modules as well as modules configured with fiber bundles looped to have ends potted in a common header. Permeate can be withdrawn through one or more of the headers.

In some aspects, the invention combines the one or more advantages associated with traditional module systems with those of immersed systems. For example, newer immersed systems can incorporate advanced scouring technology based on jet aeration techniques. Jet aerators typically entrain a gas, typically air, into a liquid stream which then can be directed toward or within the membrane modules or bundles in a multi-phase flow regime. The scouring fluid can thus have particulate matter, liquid to be purified, and/or entrained gas. Such multi-phased scouring fluids may be more energy dependent per unit air volume than simple bubbling, but nonetheless, the flow effect may provide technical and/or operational advantages by, for example, improving liquid circulation and directing gas to positions or regions that are most effective in maintaining membrane performance, which may provide improved overall or system-wide efficiency.

Thus, in some aspects, the present invention advantageously utilizes jet aeration systems and techniques, while reducing or eliminating problems such as fiber breakage, misdirected air flow, and concentration polarization. At the same time, the invention can avoid or reduce costly piping and manifolding of traditional modules and the need for leak free pressure vessels and pumping of retentate. In some embodiments of the invention, a membrane module is comprised of hollow fiber membranes potted at either end, encased in a shell that at least partially restrains the fiber motion to a limited value, irrespective of membrane slack dictated by the separation distance between headers. In that way, the module is constructed similarly to traditional tangential flow modules. The resulting configuration reduces fiber breakage and can reduce if not eliminate any need to control the degree of fiber slack or longitudinal flexibility, e.g., between headers, because the fibers would be at least partially constrained to within their elastic limit. The enclosure or encasement can, in some aspects of the invention, further create a defined flow channel for liquid to flow tangentially along the membrane surface. Such configurations and assemblies can reduce or even mitigate fouling, plugging, and polarization phenomena. Thus, the encasement can thus provide most if not all the advantages of a traditional pressurized module system. Typically, the encasement must be constructed and arranged to withstand forces exerted thereon such as, but not limited to, internal pressure losses due to tangential flow. However, the amount of pressure resistance is small compared to traditional shell modules and thus the construction of the encasement does not need to involve strength materials, nor does it need to be circularly cylindrical in shape. The encasement can be constructed of any material capable of containing an inner or interior volume enclosing the fiber membrane from an exterior or outer volume, such as, but not limited to, low cost polypropylene, polyethylene, or PVC.

In an immersed system, unlike traditional pressure modules, the hydrodynamic pressure forces due to water depth are offsetting since they are similar both inside and outside the module. The enclosure or encasement can, in some embodiments, be configured as a sleeve that can surround partially or substantially the periphery of the membranes module. Particular embodiments thereof can be directed to solid or otherwise non-porous structures. However, the invention is not limited to utilizing non-porous structures. The encasement can thus comprise any structure that serves to inhibit egress of the one or more scouring fluids from the proximity of the membranes. Indeed, a porous structure having one or a plurality of apertures or openings may sufficiently serve to retain at least a satisfactory fraction of the scouring fluid against the plurality of fiber membranes. In some cases, the structure can have one or more regions that is at least partially porous and one or more other regions that is non-porous. The encasement can be a box-like structure extending along a length or longitudinal axis of the module. Thus, in some embodiments, one or more screens and/or baffle plates can maintain the scouring fluid against at least a portion of the fiber membranes. The encasement can have apertures or openings at one or both ends to allow the flow of fluid therethrough. In other embodiments, the encasement can have a pair of opposed walls positioned on either side of the module. More than 50% of the module can be enclosed by the encasement and, more preferably, 70% or above is enclosed. Moreover, variants of such embodiments may entail modules having one or more of the remaining sides open or in communication with other similarly configured modules.

Other preferred arrangements or configurations involve modules that are submerged in a tank containing the liquid suspension and wherein permeate is collected by applying a vacuum or static head to the membrane lumens. The membranes within the module can extend between upper and lower headers and the liquid suspension and the gas can be introduced beneath the lower header or in the vicinity of the lower header of the module. In still other preferred embodiments, the fluid is flowed into the module through openings in the lower header. The two-phase fluid then flows along the length of the module, creating a cross-flow effect. Either liquid or gas, or both can be injected continuously or intermittently into the module.

The encasements can be rectangularly cylindrical in shape to conform to any module design. From a space saving perspective, rectangular cylinder shapes may be preferred because they can often offer the most membrane area for a given tank volume. Because no piping is typically needed, the end sections of the casing can remain open, or, alternately it can be enclosed to allow internal pressurization. Typically, however, the casing or shell is less expensive to construct than a traditional pressure driven cylindrical module. In some cases, the casing or shell need not be liquid tight—only tight enough so that most or essentially all of the air liquid mixture is directed in the desired manner through the module. However, the traditional problems with pressurized module leaks can be avoided because any such leakage can innocuously flow from the inside of the module outwardly into the bulk liquid in the tank.

The invention, however, can also utilize some, if not all, the advantages associated with immersed module systems. Typically, the permeate is suctioned off at one or both ends of such systems so that pressurized retentate need not necessarily be utilized to force or induce liquid through the membranes. The permeate collection subsystem can thus have the same advantageous features as immersed systems. The resultant effect provides circulation within the module that is efficient, if not optimal, because gas bubbles are at least partially constrained by the encasement or shell and, in some instances can be forced into the interior of the membrane bundles.

One embodiment of the invention involves jet aeration to provide one or more scouring fluids that can be mixture of at least one liquid, at least one gas, and/or solids at any predetermined ratio. The ratio can be any ratio that provides the desired scouring effect. For example, air and the liquid to be treated or purified can be used in the scouring fluid at a gas/liquid ratio from 1:99 to 50:50. Desirable ranges vary from about 4 $m^3$ to about 9 $m^3$ air per hour per bundle to about 2 $m^3$ to about 6 $m^3$ per hour per bundle of liquid, e.g., mixed liquor. Indeed a typical scouring fluid can have about 9 $m^3$ of air and about 4 $m^3$ to 4.5 $m^3$ of mixed liquor per hour per module or bundle. The scouring fluid can be directed through the jet aeration system at any desirable pressure but is typically at least at a pressure that overcomes the static head and, in some cases, also any momentum head and fluid dynamic losses through the fixtures.

The scouring fluid motivated by such jet aeration subsystems can flow up through the module. In some embodiments of the invention, the jet aerator assembly creates small scale or localized membrane vibration phenomenon that loosen any particles that might otherwise attach to the membrane surfaces, eliminates concentration polarization, provides additional feed liquid into the module to reduce localized retentate particle concentration, and/or generates scouring effect throughout the membrane bundle. Unlike traditional immersed systems, efficient scouring fluid flow of the invention is at least partially if not entirely directed against the membranes, resulting a more energy efficient use of air and recirculation resources. Still there is enough membrane movement to prevent particulate plugging. Backwash and chemical cleaning may also be utilized.

Jet aeration systems and techniques of the invention can be performed through one or more headers as in traditional immersed systems. Jet aeration systems and techniques of the invention are not limited to being initiated from the lower header and into the bundles because the system can be connected along a periphery or side of the module or fiber bundle so that a direct scouring effect can be driven to be perpendicularly oriented relative to the longitudinal aspect of the membranes. Further, one or more scouring fluids can be directed in a spiral manner within the bundle volume by using vortex forces thereby further to improving membrane performance and reduce fouling.

The module can be immersed in any direction—vertical, horizontal, or at an angle. In any of these directions, scouring fluid flow can be directed such that a desired degree of scouring can occur by configuration and/or arrangement of the aeration flow pushing against the inside walls of the encasement or enclosure. Air/liquid mixtures, for example, can also be injected at different locations 10a along the fiber bundle in an unlimited number of combinations. In fact, at effective air/liquid jet velocities, air bubbles can be injected into the top end 7 of a vertical module and forced downwardly and eject out of the bottom 8 of the module 8, which is likely to maximize the scouring effect of the bubbles as they will maintain their size throughout—starting out small at the top of the tank and low pressure and then coalescing but maintaining low bubble size because of the increase in pressure as they stream toward the bottom of the tank. Similar to immersed systems, the volume of gas can be varied over time from high levels to zero, depending on optimization of fouling, flux, and energy costs.

In certain applications such as those pertinent to wastewater treatment requiring, for example, return activated sludge, one drawback of traditional immersed systems is that there is no convenient position within the tank where more concentrated sludge is available. In the present inventive construction, the outlet retentate circulation flow from the module will be a particular point of high solids content that can be either pulled off back and recycled to an earlier stage of the process or removed from the process for sludge dewatering or other treatment, such as chemical treatment for phosphorous removal. In other applications where wastewater contains solids that may damage membrane fibers such as trash or hair, the shell modules of the invention have a further advantage in that the source of liquid to the fibers is at a localized position, which can thus be much more readily strained or filtered of harmful solids than if the entire membrane bundle was exposed directly to tank liquid.

The enclosure typically would not directly contact the any of the membranes in a bundle, but would be separated by some distance by a screen. The screen would allow liquid flow to contact the outermost membrane fibers while at the same time, allowing controlled movement and vibration of the fibers as the scouring jet mixture flow tangentially passes through the module.

In accordance with some aspects, the invention may be embodied as a membrane filtration module having a plurality of permeable, hollow membranes mounted therein. In typical use, a pressure differential is applied across the walls of the permeable, hollow membranes immersed in a liquid suspension containing suspended solids, said liquid suspension being applied to one surface of the permeable, hollow membranes to induce and sustain filtration through the membrane walls wherein some of the liquid suspension passes through the walls of the membranes to be drawn off as clarified liquid or permeate, and at least some of the solids are retained on or in the permeable, hollow membranes or otherwise as suspended solids within the liquid suspension, the module including a fluid retaining means at least partially surrounding the membrane module for substantially retaining at least part of fluid flowed into the membrane module. The permeate is collected by application of a vacuum or static head to a permeate side of the membrane walls.

The fluid retaining means can be, in some embodiments of the invention, a sleeve or shell substantially surrounding the periphery of the membrane module. Typically, the sleeve or shell is solid, at least preventing direct communication between an interior volume and an exterior volume of the sleeve or shell. The sleeve or shell, however, can have, in some case openings or apertures at least one end thereof that allow the flow of fluid therethrough or between the interior volume and the exterior volume. Further embodiments of the invention contemplate configurations wherein the sleeve or shell has a box-like structure extending along a substantial portion if not the entire length of the module. Indeed, in some cases, more than about 50% of the module is enclosed by the fluid retaining means. Where advantageous, configurations of the modules of the invention involve enclosing at least 70% of the module by the fluid retaining means. The fluid retaining means can at least partially surround one or more groups of membrane modules.

In accordance with further aspects of the invention, the fluid retaining means can be at least one pair of opposed walls positioned on either side of the module.

The invention contemplates configurations wherein the modules are submerged in a tank containing a liquid suspension, having solids suspended in a liquid. Furthermore, the scouring fluid can comprise the liquid to be treated or purified. For example, the scouring fluid can be introduced through the jet aeration system as a three-phase mixture of a gas and a liquid having solids suspended therein. Mixing of the scouring liquid components can be effected upstream of a point of introduction into the enclosure volume, at the point of introduction, or within the enclosure volume.

The fluid can be a gas, mixture of a gas and a liquid or gas, a liquid, solids, typically suspended in the liquid. A portion of the fluid can include at least some of the liquid suspension. The fluid can be introduced beneath a lower header or in the vicinity of the lower header of the module or at any position along the longitudinal aspect of the fiber membranes. The fluid can be introduced into the module, into the interior volume defined by the sleeve or shell through one or more openings in the lower header. In some cases, the introduced fluid flows along the length of the module and can create a cross-flow. The fluid can be introduced continuously, continually, intermittently, or periodically.

Further aspects of the invention can involve methods of filtering solids from a liquid suspension using a plurality of permeable, hollow membranes mounted in a membrane module. Some embodiments thereof can involve introducing a fluid containing the liquid suspension into the membrane module such that the liquid suspension is applied to one surface of the permeable, hollow membranes. A pressure differential across the walls of the permeable, hollow membranes immersed in the liquid suspension containing suspended solids can be applied or otherwise be created to induce filtration through at least a portion of the membrane walls. Some of the liquid suspension thus passes through the walls of the membranes and be withdrawn off as clarified liquid or permeate during which some of the solids suspended in the liquid are retained on or in the permeable, hollow membranes or otherwise as suspended solids within the liquid suspension. The fluid retaining means can retain at least a portion, if not a substantial part, of at least part of the fluid flowed into the membrane module by at least partially surrounding the membrane module with the sleeve or shell that at least partially, if not substantially, surrounds the periphery of the membrane module. The method can further involve applying a vacuum or inducing a static head to a permeate side of the membrane walls to facilitate withdrawal of the permeate fluid.

FIGS. 1a to 1c illustrate the operation of three different module configurations. The membrane module 5 in each configuration has a plurality of hollow fiber membranes 6 extending between upper and lower headers 7 and 8. The fibers 6 in the upper header 7 opening into a permeate collection chamber 9. The lower header 8 has a plurality of aeration openings 10 for feeding gas and/or liquid into the membrane module. An open mixing chamber 11 is provided below the lower header 8 and is usually formed by a downwardly extending skirt 12. One or more particulate screens (not shown) may be used to remove large-sized solids (such as hair or trash) and prevent damaging the membranes.

FIG. 1*a* is the configuration of one embodiment of the invention. Gas, typically air, and liquid feed are injected into a membrane module 5 within an enclosure or sleeve 13 surrounding the periphery of the module 5. The scouring mixture then flows upward along the module 5 creating a cross-flow or transverse fluid direction forces. The gas bubbles and the concentrated feed can be released at the vicinity of the upper header 7 of the module 5 through one or more openings 14 in the upper portion of the enclosure 13.

The gas and feed liquid can be mixed in the open chamber 11 beneath the lower header 8, and then fed into the module 5. Alternatively, the multi-phase fluid can be directly injected to the lower header 8 through a direct connection (not shown). Either gas or liquid, or both can be supplied continuously or intermittently.

FIG. 1*b* shows a module configuration wherein a module 5 has a perforated screen 15. Although a mixture of gas and feed liquid is injected into the module 5, the gas bubbles can partly escape from any portion of the module 5 and the feed liquid may also escape through diffusion with the bulk feed liquid. Accordingly, the cross-flow effect may be reduced in such a configuration but can still provide sufficient retentive capacity that creates relatively improved scouring forces.

If no screen is used with the module 5 the membrane fibers 6 can move in a larger zone as shown in FIG. 1*c*. When gas and/or liquid feed is injected into the module 5, the membrane cleaning can be achieved by gas scouring of swayable fibers. The liquid near the membrane surface is refreshed by transfer with the bulk phase. The scouring fluids is free to escape from the confines of the module, thus there is little or no cross-flow effect.

U.S. Pat. No. 6,524,481, which is incorporated herein by reference in its entirety discloses the benefit of employing multi-phase mixture to scrub membranes. When the enclosure of the invention is used to restrict the flow dispersal, the energy of the scouring fluid is efficiently utilized.

It will be appreciated that this concept is easily applied to modules of other configurations, such as rectangular and square modules. FIGS. 2*a* to 2*d* illustrate embodiments of the invention involving a rectangular module 5 with an enclosure 13. When the feed liquid and gas are injected to the lower header 8 of the module 5, a cross-flow is created along the module.

Figure 3:
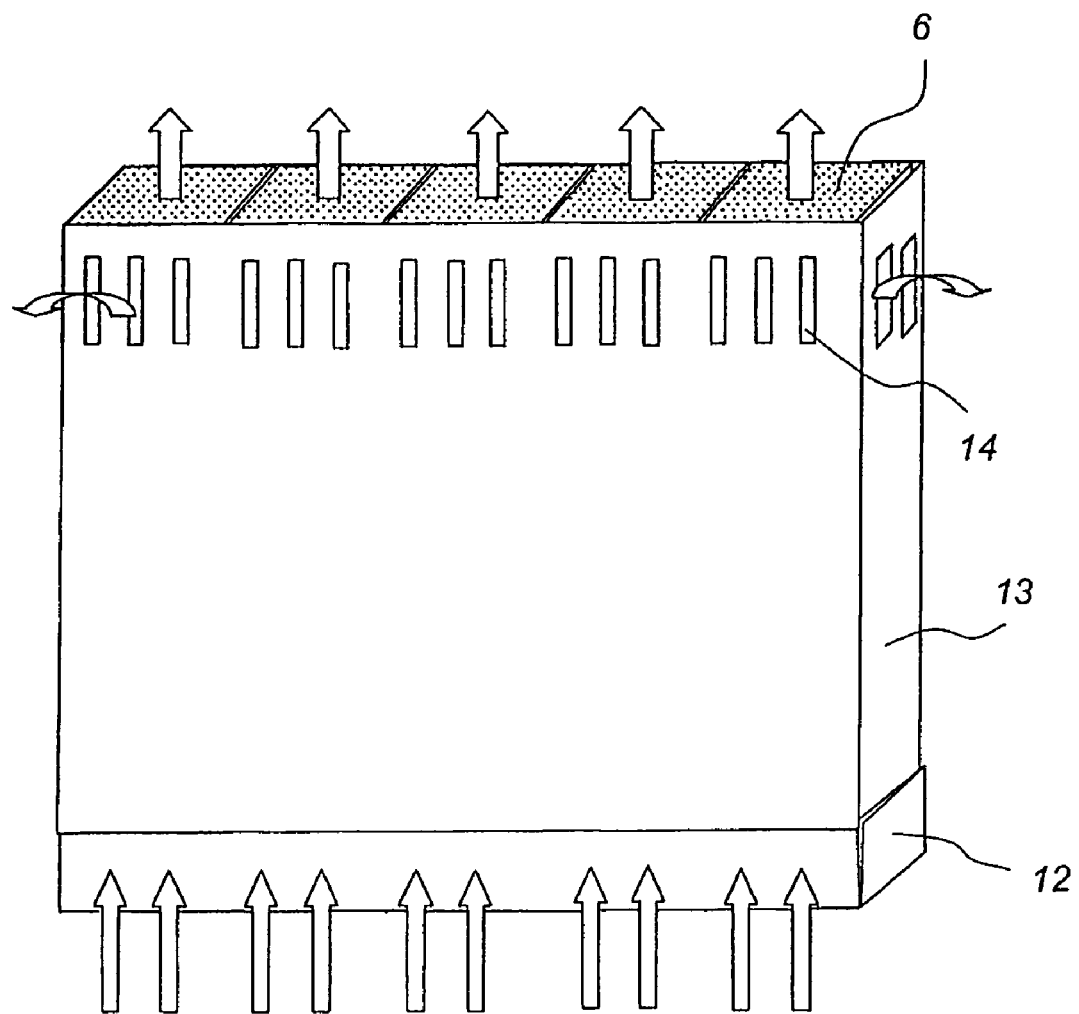
FIG. 3 is a schematic illustration showing a perspective view of a membrane module configuration according to yet another embodiment of the invention.

Instead of using an enclosure for each individual module 5, an alternative embodiment may use a common enclosure 13 for an array of modules of fiber membranes 6 as shown in FIG. 3. The illustrated embodiment can advantageously provide an increased transverse flow component, relative to the longitudinal aspect of the fiber membranes, that can potentially propagate to one or more proximately disposed modules and/or bundles of fiber membranes.

The modules need not be fully enclosed to provide a cross-flow effect, a pair of opposed baffle walls on one or more sides of the module or array of modules can be used to at least partially retain the flow of scouring fluid within the enclosed module or bundle volume.

Figure 4:
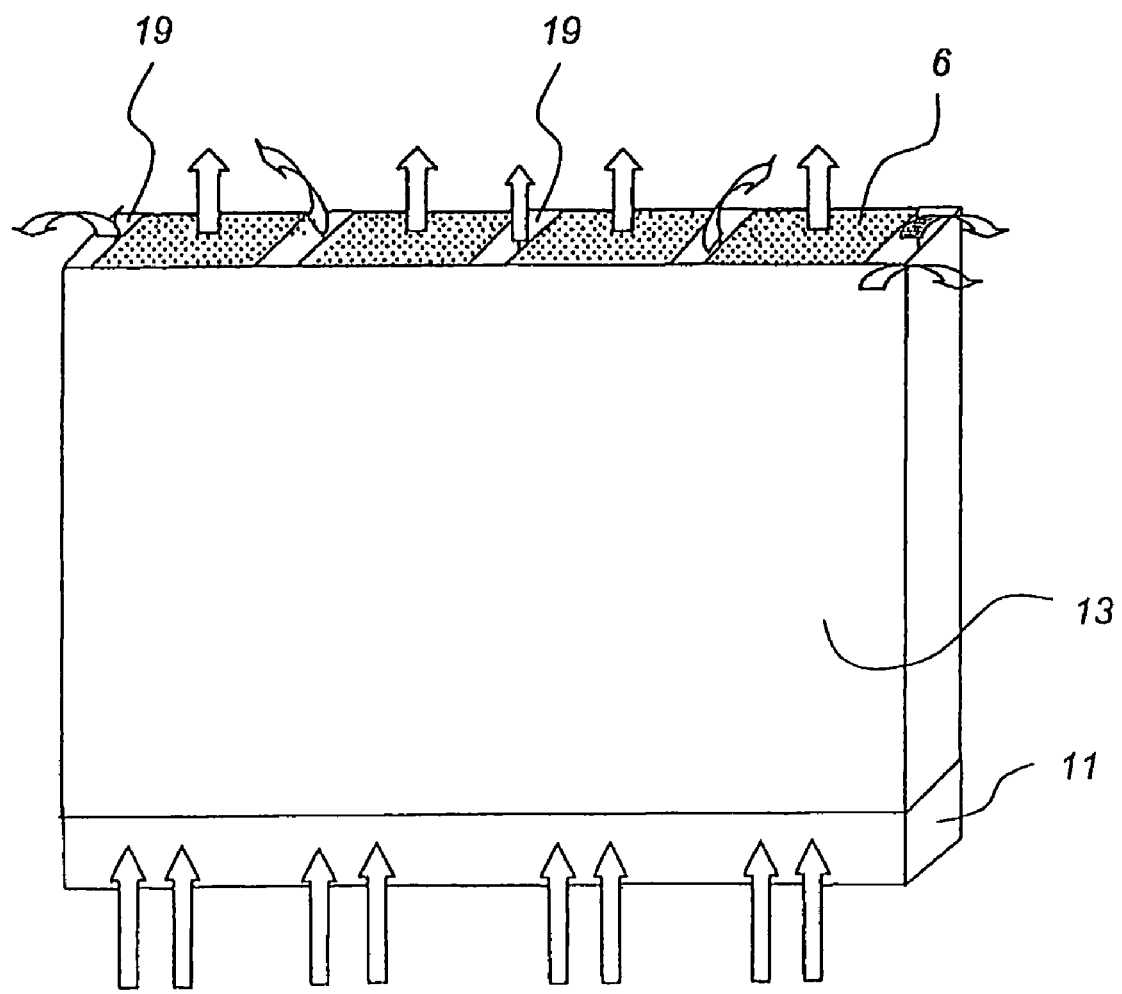
FIG. 4 is a schematic illustration showing a perspective view of a membrane module configuration according to yet another embodiment of the invention.

In the above examples, the gas and/or the concentrated feed are released through openings 14 in the enclosure 13 near the upper header 7 of the module or modules, they can also be released through the spaces, openings, or gaps 16 defined or created within the bundle; sub-modules; or between the modules as illustrated in FIG. 4. Such a configuration can advantageously increase the scouring efficiency because entrained or suspended solids can be directed dispersed from the one or more modules with encountering a change in direction that could create an impingement of the suspended solids flow path.

Figure 5:
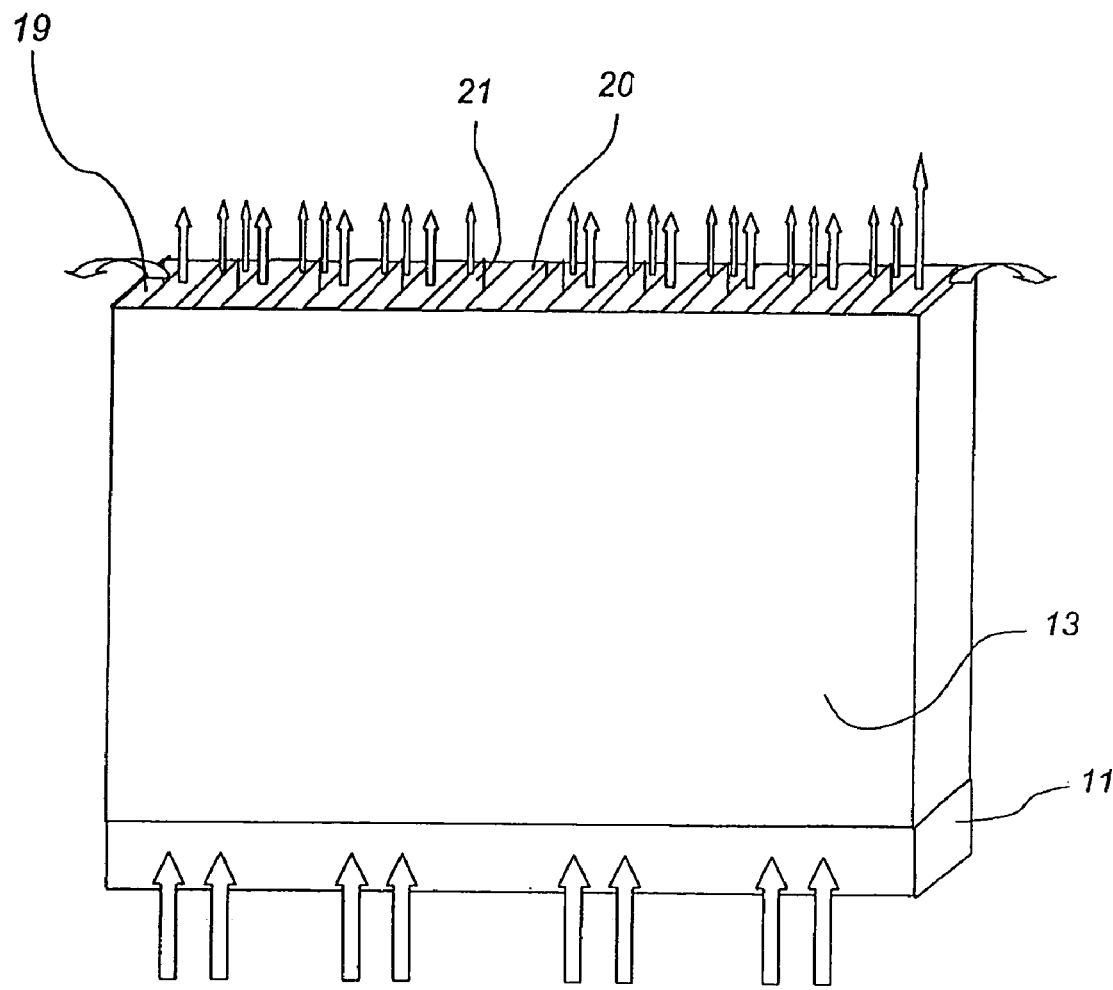
FIG. 5 is a schematic illustration showing a perspective view of a membrane module configuration according to still another embodiment of the invention.

FIG. 5 shows another arrangement of the module enclosure shown in FIG. 4. In the applications of high suspended solids feed, it is desirable to reduce the membrane fiber depth to minimize solids build-up in the module. One method, as shown in FIG. 5, is to use membrane fiber bundles or mats 20, which is comprised of a geometrically arranged bundle of fiber membranes, extending along the length of the module 5 in a similar fashion to the fiber membrane bundles. To enhance the scouring effect, baffle plates or separators 21 may be provided between the mats or groups of mats to further confine and direct the upward flow of scouring fluid, illustrated as exiting through spaces 19 between the bundles 20.

In the description above, gas and feed, fluid to the treated or purified, are typically injected from beneath the lower header. Alternatively, gas and feed may also be injected from the side of the lower header into the enclosure 13.

Some aspects of the invention may involve one or a plurality of sensors as well as one or a plurality of types or kinds of sensors (not shown). Sensors that may be utilized in the systems and techniques of the invention can measure or provide, for example, density, flow rate, viscosity, turbidity, conductivity, pressure, temperature, pH, streaming current, oxidation-reduction potential, and concentration of one or more species, of one or more fluids or components of fluids of the treatment or purification system. Any one or more of these sensors may be disposed or configured to measure or otherwise provide an indication of the operating status or can provide a direct or indirect indication of a characteristic or property of a stream or unit operation in the system or component thereof. Other embodiments of the invention may involve one or more sensors measuring various characteristics of, for example, the retentate, the permeate, or the pressure differential across one or more membrane modules.

A process parameter, as used herein, is typically a measured or calculated quantity and can include, for example, pH, temperature, pressure, pressure differential, oxidation-reduction potential, concentration, flow rate, turbidity, and viscosity. Process parameters can also be intrinsic quantities such as, but not limited to, density, thermal conductivity, and heat capacity.

The system of the invention can optionally include one or more control systems or controllers that facilitate operating parameters of treatment or purification system. Typically, the controller (not shown) is configured to receive at least one indication of a characteristic of the purification or treatment system or one or more components thereof and preferably, further react or provide an appropriate response to the measured characteristic. For example, a characteristic of the permeate stream withdrawn from one or more membrane modules can be monitored by one or more sensors. The measured characteristic can be transmitted to the controller which, if necessary, generates a corresponding signal according to a control scheme. The control signal is typically transmitted to one or more sub-unit operations of the treatment system to adjust one or more operating conditions thereof. The control loop involving such components may utilize any conventional control technique including, for example, proportional, integral, and derivative schemes as well as combinations thereof. For example, the controller of the invention may vary the ratio of gas to liquid used as the scouring fluid, vary the delivered pressure or volume of the scouring fluid, vary the position or point of introduction of the scouring fluid in the one or more modules or bundles, and/or vary the period or duration of scouring.

Varying any one or more parameters of the jet aeration system or the scouring fluid can be effected through activation or energizing valves or motors. For example, the jet aeration system may be intermittently operated, e.g., alternating on/off periods of 3 minutes by actuating valves that direct the scouring liquid to a first module and/or to another module.

The invention may be practiced to involve other control configurations. For example, the control technique may incorporate adaptive methods that involve machine learning with or without statistical analysis, expert systems that apply reasoning capabilities to reach a conclusion, case-based reasoning, Bayesian networks, and/or behavior-based methods; and/or computational intelligence that involve iterative development or learning, e.g., parameter tuning that implicate neural networks or systems with predominant pattern recognition capabilities, fuzzy systems or techniques for reasoning under uncertainty, and evolutionary computational schemes that, for example, mimic biological behavior to generate increasingly stable control solutions.

The one or more controller of the systems of the invention may be implemented using one or more computer systems which may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the computer system may include specially-programmed, special-purpose hardware, for example, an application-specific integrated circuit (ASIC) or controllers intended for water treatment system.

The computer system can include one or more processors typically connected to one or more memory devices, which can comprise, for example, any one or more of a disk drive memory, a flash memory device, a RAM memory device, or other device for storing data. The memory component is typically used for storing programs and data during operation of the system and/or the computer system. For example, memory may be used for storing historical data relating to the parameters of the water over a period of time, as well as current sensor measurement data. Software, including programming code that implements embodiments of the invention, can be stored on a computer readable and/or writeable nonvolatile recording medium, and then typically copied into one or more memory components wherein it can then be executed by the one or more processors. Such programming code may be written in any of a plurality of programming languages, for example, Java, Visual Basic, C, C#, or C++, Fortran, Pascal, Eiffel, Basic, COBAL, or any of a variety of combinations thereof.

The components of the computer system may be coupled by an interconnection mechanism, which may include one or more busses (e.g., between components that are integrated within a same device) and/or a network (e.g., between components that reside on separate discrete devices). The interconnection mechanism typically enables communications (e.g., data, instructions) to be exchanged between components of system.

The computer system can optionally include one or more input devices, for example, a keyboard, mouse, trackball, microphone, touch screen, and one or more output devices, for example, a printing device, display screen, or speaker. In addition, the computer system may also optionally have one or more interfaces that can connect the computer system to one or more communication networks (in addition or as an alternative to the network that may be formed by one or more of the components of system).

According to one or more embodiments of the invention, the one or more input devices may include sensors for measuring parameters of the incoming and treated streams such as one or more of sensors, and the one or more output devices may include one or more components, such as metering valves and/or pumps of, for example, an air or gas source or a liquid source for the scouring fluid. Alternatively, the sensors, the metering valves and/or pumps, or all of these components may be connected to a communication network that is operatively coupled to computer system. For example, one or more sensors may be configured as input devices that are directly connected to one or more controllers, metering valves and/or pumps of one or more subsystems, may be configured as output devices that are connected to the controller, and any one or more of the above may be coupled to another computer system or component so as to communicate with one or more computer systems of the controller over a communication network. Such a configuration permits one sensor to be located at a significant distance from another sensor or allow any sensor to be located at a significant distance from any subsystem and/or the controller, while still providing data therebetween.

The controller can include one or more computer storage media such as readable and/or writeable nonvolatile recording medium in which signals can be stored that define a program to be executed by one or more processors of the controller. The computer-readable medium may, for example, be a disk or flash memory. In typical operation, one or more processors can cause data to be read from the storage medium into a memory component that allows for faster access to the information by the one or more processors than does the medium. Memory is typically implemented as volatile, random access memory such as a dynamic random access memory (DRAM) or static memory (SRAM) or other suitable devices that facilitates information transfer to and from the one or more processors.

It should be appreciated that the invention is not limited to being implemented in software, or on the computer system. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by controller 140 can be performed in separate computers, each of which can be in communication through one or more networks.

EXAMPLE

A standard submerged membrane filtration module, containing 2,200 fibers, was tested to filter mixed liquor from the bioreactor. Without the enclosure, an air flow-rate of 3 $m^3$/hr was required to achieve a stable filtration performance at a flux of 30 $L/m^2$/hr. When an enclosure was used, the air requirement was dropped to 2 $m^3$/hr to achieve a similar result, a saving of air by 33%.

The filtration process provided by the invention is different from the conventional cross-flow filtration process, as the gas scouring generates more efficient cleaning with less energy in the submerged cross-flow filtration system. The enclosure used is of a low cost and needs little pressure tolerance.

Thus, the submerged cross-flow filtration system described here combines the low capital cost of the submerged system with the efficiency of the cross-flow process.

While the inventive concept has been illustrated in the embodiments and examples with reference to hollow fiber membrane modules in a vertical configuration it will be appreciated the invention is also applicable to flat sheet membranes and capillary membranes with a horizontal or non-vertical orientation.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, the invention contemplates sequentially configured membrane modules wherein retentate removed from a first or an upstream module is introduced into a second or a downstream module as liquid to be treated. In other contemplated configurations, retentate is recycled through one or more module subsystems, sequentially or in parallel to other module assemblies. Accordingly, the foregoing description and drawings are by way of example only.

What is claimed is:

1. A membrane filtration system comprising:
   a vessel having an inlet fluidly connectable to a source of a liquid having solids suspended therein;
   at least one membrane module disposed in the vessel, the membrane module comprising
      a plurality of hollow fiber membranes extending between an upper potting head and a lower potting head, and a solid, non-porous sleeve surrounding the plurality of hollow fiber membranes, the upper potting head, and the lower potting head, and extending an entire length of the membrane module;
   at least one scouring port fluidly connected to an aerator and to the source of the liquid;
   a flow channel defined by the solid, non-porous sleeve, and the upper potting head, the lower potting head, and the plurality of hollow fiber membranes, said flow channel constructed and arranged to allow for the liquid to flow tangentially along the plurality of hollow fiber membranes, the upper potting head, and the lower potting head; and
   a retentate exit port disposed adjacent to at least one of the lower potting head and the upper potting head, opposite the at least one scouring port.

2. The membrane filtration system of claim 1, wherein the membrane module further comprises a screen disposed adjacent an enclosed surface of the solid, non-porous sleeve.

3. The membrane filtration system of claim 1, further comprising a gas and liquid mixing chamber fluidly connected to at least one scouring port.

4. The membrane filtration system of claim 1, wherein at least one scouring port is disposed in an upper potting head of the membrane module.

5. The membrane filtration system of claim 1, wherein the solid, non-porous sleeve has a liquid exit port medially disposed between the upper potting head and the lower potting head.

6. The membrane module of claim 1, wherein at least one scouring port is disposed in the lower potting head.

7. The membrane module of claim 1, wherein the scouring fluid further comprises suspended solids.

8. The membrane module of claim 1, further comprising baffle at least one disposed within the solid, non-porous sleeve.

9. A membrane module comprising:
   a plurality of hollow fiber membranes extending between an upper potting head and a lower potting head;
   means for introducing a scouring fluid to the plurality of hollow fiber membranes fluidly connected to an aerator and to a source of a liquid;
   a solid, non-porous sleeve surrounding the plurality of hollow fiber membranes, the upper potting head, and the lower potting head, and extending an entire length of the membrane module;
   a flow channel defined by the solid, non-porous sleeve, and the upper potting head, the lower potting head, and the plurality of hollow fiber membranes, said flow channel constructed and arranged to allow for a fluid to flow tangentially along the plurality of hollow fiber membranes, the upper potting head, and the lower potting head; and
   a retentate exit port disposed adjacent to at least one of the lower potting head and the upper potting head, opposite the means for introducing a scouring fluid.

10. The membrane module of claim 9, wherein the plurality of fiber membranes are arranged in at least two bundles each defining a sub-module.

11. The membrane module of claim 10, further comprising a baffle plate disposed between at least two sub-modules.

12. The membrane module of claim 11, further comprising means for adjusting a gas to a liquid ratio of the scouring fluid.

13. A method of purifying water having solids suspended therein, comprising:
   introducing the water to be purified through a first end of a flow channel of a membrane module comprising a solid sleeve surrounding a plurality of hollow fiber membranes, a lower potting head, and an upper potting head, and extending an entire length of the membrane module, the solid sleeve defining the flow channel for the water to flow tangentially along the lower potting head, the upper potting head, and the plurality of hollow fiber membranes, and the membrane module having a retentate exit port disposed adjacent to at least one of the lower potting head and the upper potting head;
   introducing a scouring fluid comprising a mixture of a gas and a liquid into the flow channel by an aerator fluidly connected to a source of a liquid;
   withdrawing permeate through the hollow fiber membranes and an exit port in at least one of the lower potting head and the upper potting head; and
   withdrawing retentate through the flow channel at an end opposite the first end of the membrane module.

14. The method of claim 13, wherein the scouring fluid further comprises suspended solids.

15. The method of claim 13, wherein the scouring fluid is introduced into the volume through at least one scouring port disposed in at least one of the lower potting head and the upper potting head.

16. The method of claim 13, further comprising withdrawing retentate through the retentate exit port and introducing the withdrawn retentate to a second membrane module.

17. The method of claim 13, further comprising introducing a second scouring fluid into the volume.

18. The membrane module of claim 13, wherein at least one scouring port is disposed in the upper potting head.

19. The method of claim 13, wherein withdrawing permeate through the hollow fiber membranes comprises suctioning off permeate from an inner permeate side of the membrane module.

* * * * *